United States Patent [19]
Sakai et al.

[11] Patent Number: 5,517,101
[45] Date of Patent: May 14, 1996

[54] STEPPING MOTOR CONTROL DEVICE FOR AUTOMOBILE AIR-CONDITIONING SYSTEM

[75] Inventors: Yoshimi Sakai; Toshiya Yamashita; Fuhito Umegaki; Hiroshi Ohsawa; Shinichi Ohi, all of Konan, Japan

[73] Assignee: Zexel Corporation, Japan

[21] Appl. No.: 162,623

[22] Filed: Dec. 7, 1993

[30] Foreign Application Priority Data

Dec. 7, 1992 [JP] Japan ..................................... 4-351336

[51] Int. Cl.⁶ ................................................. G05B 19/40
[52] U.S. Cl. .......................... 318/685; 318/660; 318/569; 318/466; 165/42
[58] Field of Search ........................ 165/42, 14; 318/685, 318/696, 560, 569, 466

[56] References Cited

U.S. PATENT DOCUMENTS

| | | | |
|---|---|---|---|
| 4,203,059 | 5/1980 | Kraus | 318/446 |
| 4,803,414 | 2/1989 | Kato | 318/696 |
| 4,857,952 | 8/1989 | Fukushima et al. | 318/685 |
| 4,976,461 | 12/1990 | Takahashi | 165/42 |
| 5,017,851 | 5/1991 | Heinzman | 318/685 |
| 5,083,230 | 1/1992 | Nishioka | 318/696 |
| 5,333,678 | 8/1994 | Mellum et al. | 165/42 |

FOREIGN PATENT DOCUMENTS

1206415   8/1989   Japan.

*Primary Examiner*—William M. Shoop, Jr.
*Assistant Examiner*—Karen Masih

[57] ABSTRACT

A stepping motor control device for an automobile air-conditioning system has a key-off home-position setting unit of a stepping motor for driving an air-conditioning door in response to switching of a key switch of the automobile off. The key-off home-position setting unit, responsive to switch of the key switch off, drives the stepping motor so that the air-conditioning door comes to a full-close position or a full-open position, stores data indicative of the full-close or full-open positions, as a current position of the air-conditioning door in a memory, and thereby finishes a home-position setting of the stepping motor. The key-off home-position setting unit is supplied with power from a power source under control of a timer for a prescribed time within which a home-position setting can be finished. When the key switch is turned on, the key-on control unit judges whether or not a current position of the air-conditioning door given by the key-off home-position setting unit is stored in the memory, and starts a normal air-conditioning control without performing a home-position setting if the current position is stored.

26 Claims, 9 Drawing Sheets

STEPPING MOTOR CONTROL DEVICE FOR AUTOMOBILE AIR-CONDITIONING SYSTEM

BACKGROUND OF THE INVENTION

The present invention relates to a stepping motor control device for an automobile air-conditioning system, in particular, relates to a control device of a stepping motor for driving an air-conditioning door.

A device for controlling a stepping motor which is controlled by an open loop is shown in the Japanese Patent Laid Open Publication No. 1-206415. This publication shows, as an embodiment, a control of a stepping motor applied to a pump for supplying lubricating oil to an apex seal and a side seal of a rotary engine. This device detects whether or not a revolution of an engine is below an idling revolution (800 rpm), and resets the stepping motor which is controlled by an open loop to a home position each time when the number of cases with revolution below the idling revolution reaches a prescribed number. According to this, as the stepping motor is reset to the home position each time when the number of cases with revolution below the idling revolution reaches the prescribed number, positional slippage due to a step-out of the stepping motor can be corrected.

However, if a conventional system like this is applied to driving of an air-conditioning door, including an air-mix door, a mode door, etc. of an automobile air-conditioning system, such a home position resetting of a stepping motor for driving an air-conditioning door is reiterated during an air-conditioning control. The result is that a proper air-conditioning status cannot be attained. Because of this, in the case of a conventional automobile air-conditioning system for driving an air-conditioning door by a stepping motor which is controlled by an open loop, the air-conditioning door is always returned to a predetermined home position and the stepping motor is reset to the home position when a key switch is turned on. A normal air-conditioning control is started only after the stepping motor has been reset to the home position.

According to a conventional automobile air-conditioning system like this, a rise of air-conditioning when a key switch is turned on is delayed, because, even when the key switch is turned on, air-conditioning is started only after the air-conditioning door has been returned to the predetermined home position and the stepping motor has been reset to the home position. Thus, there is a problem from a viewpoint of attaining an optimal air-conditioning of a car-room within as short a time as possible.

SUMMARY OF THE INVENTION

It is an object, therefore, of the present invention to overcome the disadvantages and limitations of the above-noted conventional automobile air-conditioning system by providing a new and improved stepping motor control device for an automobile air-conditioning system.

Another object of the present invention is to provide a stepping motor control device for an automobile air-conditioning system which can reduce a rise time of air-conditioning when a key switch is turned on.

Still another object of the present invention is to provide a stepping motor control device for an automobile air-conditioning system which will contribute to the prevention of positional slippage of an air-conditioning door due to causes such as vibration while the key switch is off.

The above and other objects are attained by a stepping motor control device for an automobile air-conditioning system having at least one stepping motor for driving an air-conditioning door of said automobile air-conditioning system; a memory for storing a current position of said air-conditioning door, said memory being supplied power from a car-mounted battery irrespective of the on/off position of a key switch of the automobile; a key-off home-position setter, responsive to switching of the key switch of the automobile off, for performing a home-position setting of said stepping motor, said key-off home-position setter driving said stepping motor so that said air-conditioning door comes to its full-close or full-open position, storing data indicative of the full-close or full-open position in said memory as a current position of said air-conditioning door, and thereby finishing a home-position setting; a timer, responsive to switching of the key switch of the automobile off, for supplying power to said key-off home-position setter for a prescribed time within which said key-off home-position setter can finish the home-position setting; and a key-on controller, responsive to switching of the key switch of the automobile off, for judging whether or not the current position of said air-conditioning door, given by said key-off home-position setter, is stored in said memory, for starting a normal air-conditioning control without performing the home-position setting of said stepping motor when the current position is stored, and for starting the normal air-conditioning control after performing the home-position setting of said stepping motor when the current position is not stored.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will be appreciated and better understood by means of the following description and accompanying drawings, which are given by way of illustration only and thus are not limitative of the present invention and wherein:

FIG. 5 is a flow diagram of the microcomputer of FIG. 2 showing a processing when a key switch is turned on;

FIG. 9 is a flow diagram of the microcomputer of FIG. 7 showing a processing when a key switch is turned on.

DETAILED DESCRIPTION OF THE INVENTION

Figure 1:
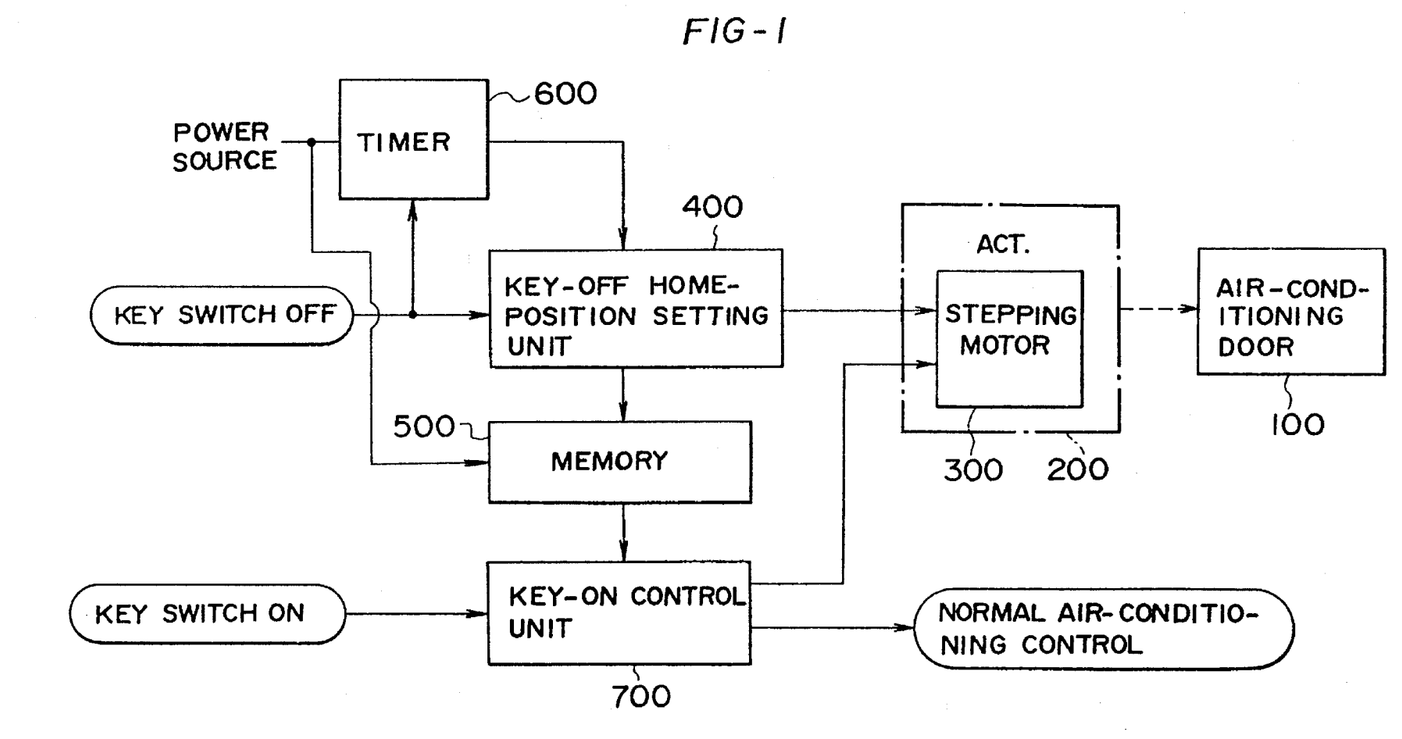
FIG. 1 is a block diagram showing a fundamental embodiment of a stepping motor control device according to the present invention.

In a fundamental embodiment of FIG. 1, a reference numeral 100 is an air-conditioning door such as an air-mix door, mode door, etc. of an automobile air-conditioning system, and a reference numeral 200 is an actuator having a stepping motor 300. The actuator 200 drives the air-conditioning door 100 by means of the stepping motor 300. A reference numeral 400 is a key-off home-position setting unit. The key-off home-position setting unit 400, responsive to switching of a key switch of an automobile off, performs a home-position setting of the stepping motor 300. The key-off home-position setting unit 400, when the key switch is turned off, drives the stepping motor 300 so that the air-conditioning door 100 comes to a full-close or full-open position and stores data indicative of the full-close or full-open position in a memory 500 as a current position of the air-conditioning door 100, and thereby finishes the home-position setting. The memory 500 is supplied power from a car-mounted battery irrespective of the on/off position of the key switch. A reference numeral 600 is a timer. The timer 600, responsive to switching of the key switch of the automobile off, supplies power to the key-off home-position setting unit 400 for a prescribed time. The prescribed time of the timer 600 is set for a sufficient time within which the key-off home-position setting unit 400 can finish the home-position setting. A reference numeral 700 is a key-on control unit. The key-on control unit 700, responsive to switching on of the key switch of automobile, judges whether or not a current position of the air-conditioning door 100 is stored in the memory 500. In case a battery change, for example, is done while the key switch is off, contents of the memory 500 are initialized and a current position of the air-conditioning door 100 dissipates. If a current position of the air-conditioning door 100 is stored, the key-on control unit 700 starts a normal air-conditioning control without performing a home-position setting of the stepping motor 300. If a current position of the air-conditioning door 100 is not stored, the key-on control unit 700 starts a normal air-conditioning control after performing the home-position setting of the stepping motor 300.

According to a composition like this, when the key switch is turned off, the air-conditioning door 100 is moved to the full-close or full-open position and information showing a current position of the air-conditioning door 100, that is, the full-close or full-open position is stored in the memory 500, and thereby the home-position setting of the stepping motor 300 is done. The key-off home-position setting unit 400 is supplied a power source by the timer 600 during the prescribed time within which the home-position setting can be finished. When the key switch is turned on, whether or not information showing a current position of the air-conditioning door 100 is stored in the memory 500 is judged by the key-on control unit 700. If information showing a current position is stored, immediately a normal air-conditioning control is started, without performing the home-position setting. By this, a rise time of air-conditioning control when the key switch is turned on can be reduced. In addition, as the air-conditioning door is moved to the full-close or full-open position in response to switching of the key switch of and put under a condition that its movement towards one direction is checked by a stopper, positional slippage due to causes such as vibration while the key switch is off can be avoided.

The contents of the fundamental embodiment will be understood more clearly by preferred embodiments described in the following.

Figure 2:
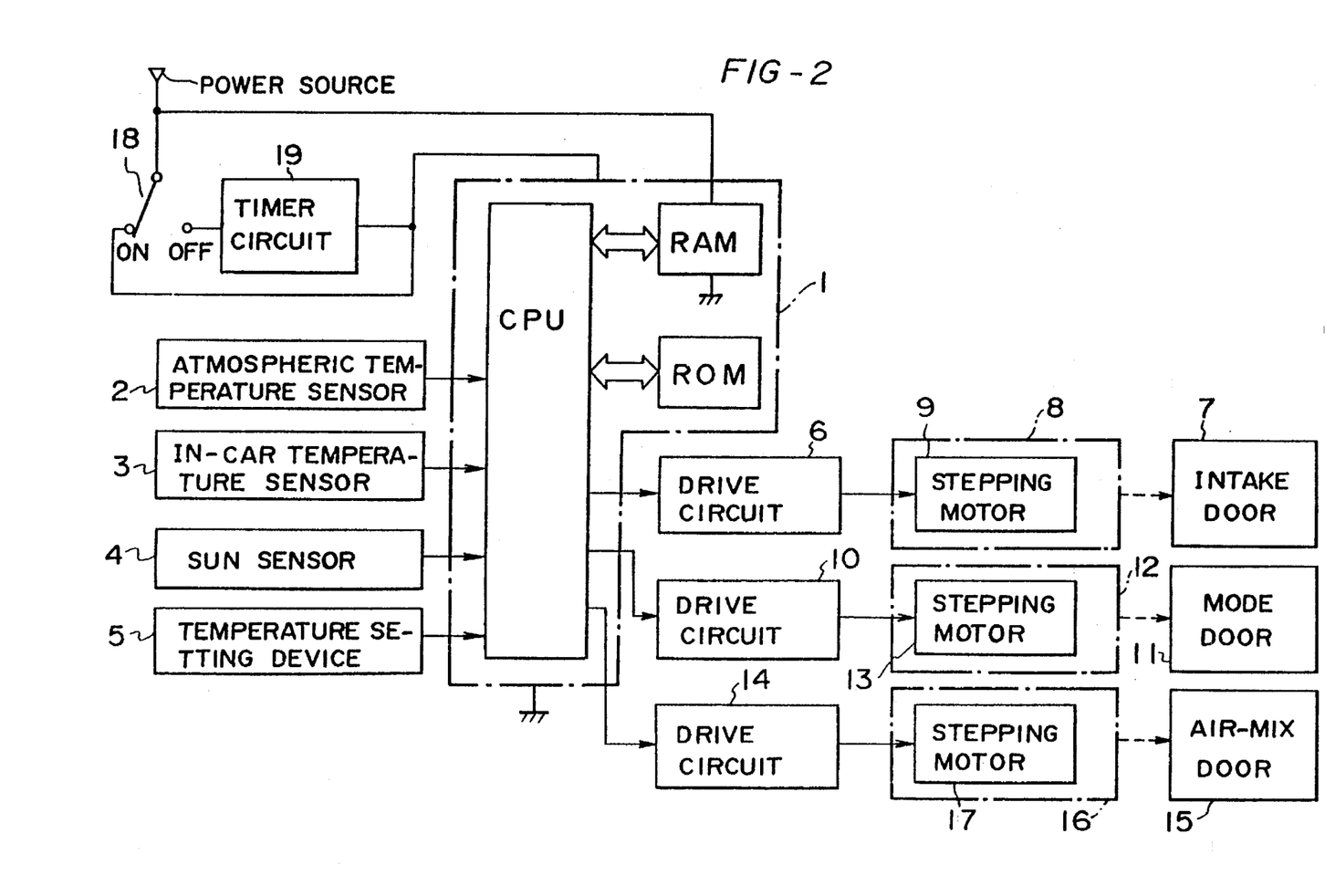
FIG. 2 is a block diagram showing a first preferred embodiment of a stepping motor control device according to the present invention.

In a first preferred embodiment of FIG. 2, a reference numeral 1 is a microcomputer. The microcomputer 1 is provided with the atmospheric temperature from an atmospheric temperature sensor 2, an in-car temperature from an in-car temperature sensor 3, a quantity of solar radiation from a sun sensor 4, and a set temperature from a temperature setting device 5. The microcomputer 1 controls a stepping motor 9 of an intake actuator 8 which drives an intake door 7 via a drive circuit 6, controls a stepping motor 13 of a mode actuator 12 which drives a mode door 11 via a drive circuit 10, and controls a stepping motor 17 of an air-mix actuator 16 which drives an air-mix door 15 via a drive circuit 14. As it is known well, the microcomputer 1 calculates a thermal load signal, which represents a quantity of thermal load for controlling a car-room for a set temperature based on the atmospheric temperature, an in-car temperature, a quantity of solar radiation and the set temperature, and controls the intake door 7, mode door 11 and air-mix door 15 based on the calculated thermal load signal so that the car-room becomes the set temperature. The microcomputer 1 also writes current positions a1, a2 and a3 of actuators 8, 12 and 16, which represent current opening positions of doors 7, 11 and 15, into a RAM. The current positions a1, a2 and a3 in the RAM are renewed to new current positions each time actuators 8, 12 and 16 are controlled by the microcomputer 1.

A reference numeral 18 is a key switch of the automobile. When the key switch 18 is turned on, an air-conditioning system, including the microcomputer 1, is supplied with power from the power source. The RAM has the microcomputer 1 of its power source backed up by a car-mounted battery so that stored contents do not volatilize even when the key switch 18 is off. A reference numeral 19 is a timer circuit. The timer circuit 19 supplies from the power power source to the air-conditioning system, including the microcomputer 1, for a prescribed time when the key switch 18 is turned off. The prescribed time of the timer circuit 19 is set for a sufficient time within which the air-conditioning system can finish a home-position setting which is mentioned in the latter part.

The microcomputer 1 has the following functions in addition to the above-mentioned well-known controls. The microcomputer 1, when the key switch 18 is turned off, moves the intake door 7, mode door 11 and air-mix door 15 to their full-close or full-open positions and sets the stepping motors 9, 13 and 17 of actuators 8, 12 and 16 in their home positions according to the flow diagrams of FIG. 3 and FIG. 4. The microcomputer 1, when the key switch 18 is turned on, starts a normal air-conditioning control without performing the home-position setting of the stepping motors 9, 13 and 17 of actuators 8, 12 and 16, excluding a case wherein a backup power source of the RAM of the microcomputer 1 is shut off for a battery change and other reasons, according to the flow diagram of FIG. 5.

Figure 3:
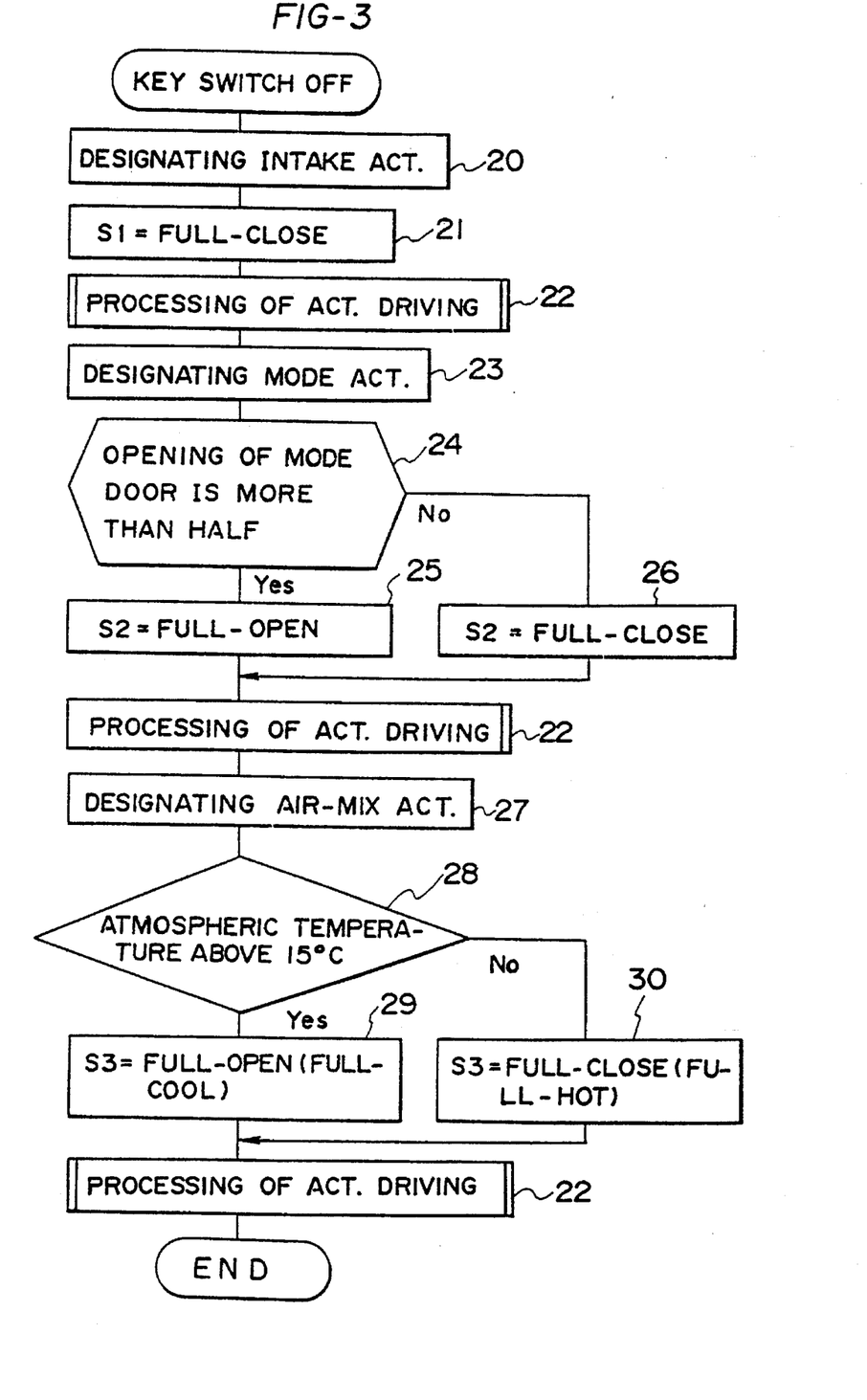
FIG. 3 is a flow diagram of a microcomputer of FIG. 2 showing a processing when a key switch is turned off.
Figure 4:
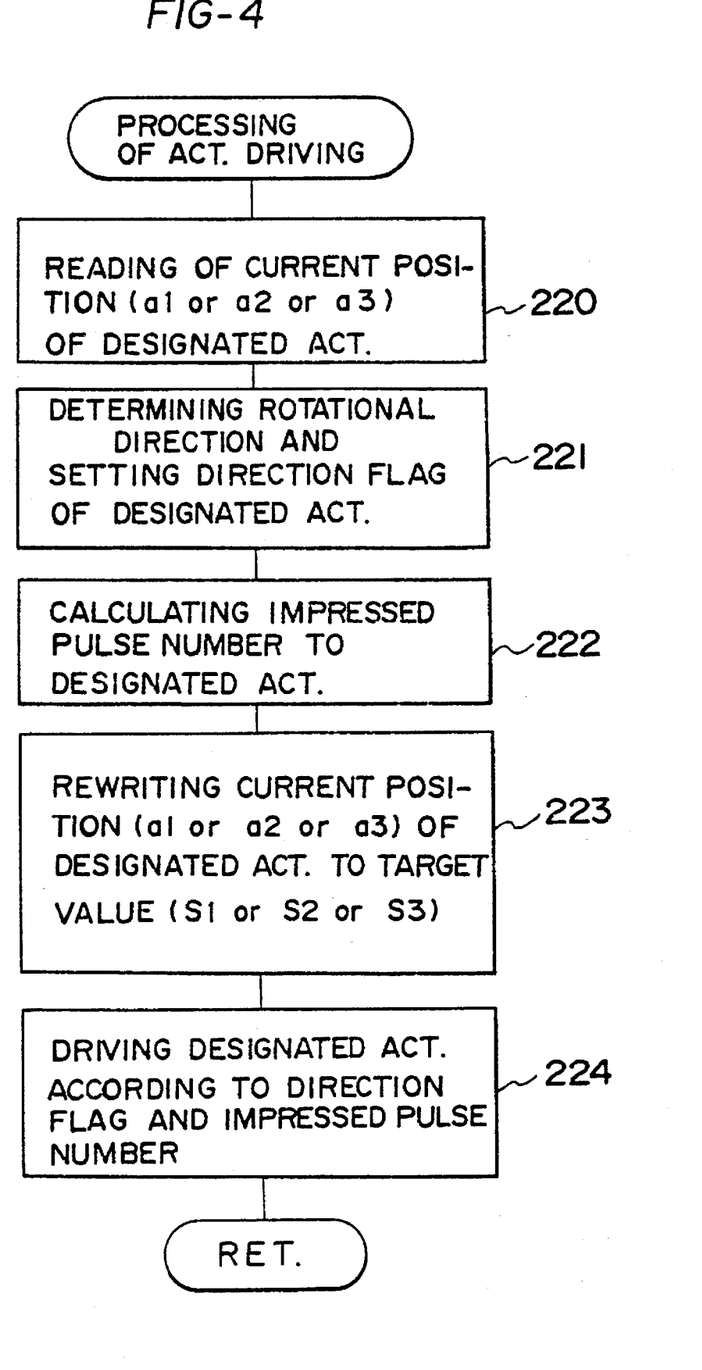
FIG. 4 is a flow diagram of the microcomputer of FIG. 2 showing an actuator driving processing of FIG. 3.
Figure 5:
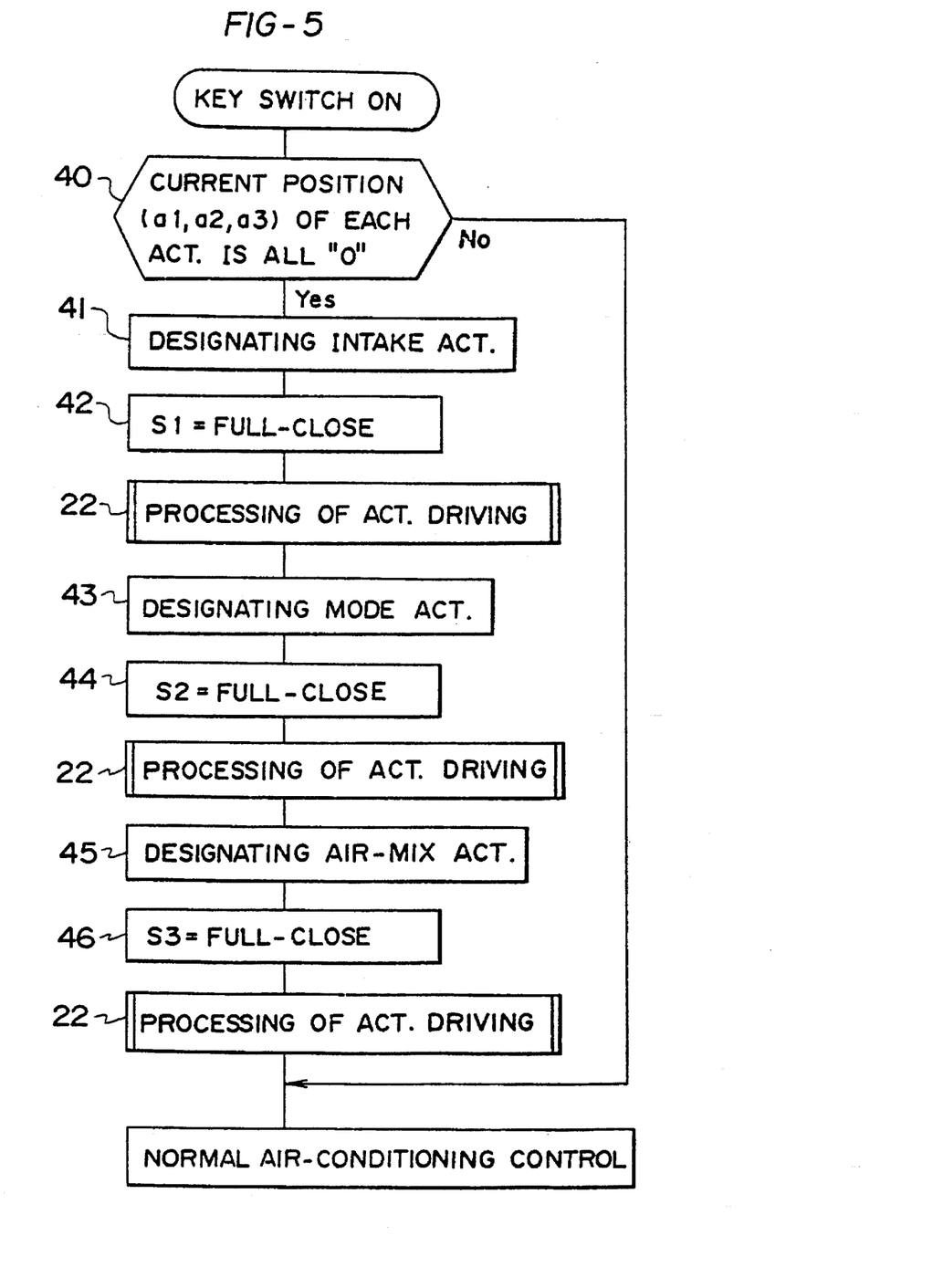

FIG. 3, FIG. 4 and FIG. 5 are flow diagrams of the microcomputer 1 of FIG. 2. FIG. 3 shows a processing of home-position setting when the key switch 18 is turned off. FIG. 4 shows a processing of actuator driving of FIG. 3 and FIG. 5. FIG. 5 shows a processing when the key switch 18 is turned on.

When the key switch 18 is turned off, power is supplied to the air-conditioning system, including the microcomputer 1, for the prescribed time by the timer circuit 19. The microcomputer 1 starts a control of FIG. 3 responding to switching of the key switch 18 off.

The microcomputer 1 designates the intake actuator 8 in a step 20, sets a target value S1 of the intake door 7 for a full-close in the following step 21, and enters a step 22. In the step 22, the processing of actuator driving of FIG. 4 is executed. In this embodiment, opening of doors 7, 11 and 15 is set to be zero for a full-open condition and a Max. for a full-close condition. The intake door 7 is provided so that it receives gravity towards a stopper on the full-close side when it is under a full-close condition. In the processing of actuator driving of FIG. 4, the microcomputer 1 reads out a current position a1 of the intake door 7 in a step 220, and enters a following step 221. In the step 221, the microcomputer 1 determines a turning direction of the intake door 7 from the current position a1 and the target value S1, sets a direction flag which represents it, and enters a step 222. In the step 222, the microcomputer 1 calculates an impressed pulse number to the stepping motor 9 of the intake actuator 8 according to a calculation formula n=(current position−target value)×K, and enters a step 223. In the above-mentioned calculation formula, n is an impressed pulse number, and K is a step angle coefficient representing how many degrees a rotational angle is proceeded with by one pulse. In the step 223, the microcomputer 1 rewrites the current position a1 of the intake door 7 in the RAM to the target value S1, and enters a following step 224. In the step 224, the microcomputer 1 drives the stepping motor 9 of the intake actuator 8 according to the direction flag and the impressed pulse number. By this, a home-position setting of the stepping motor 9 of the intake actuator 8 is finished. The intake door 7 is fully closed and receives gravity towards a stopper on the full-close side. Because of this, positional slippage due to causes such as vibration during an off condition of the key switch 18 can be avoided.

After the driving processing of the stepping motor 9 of the intake actuator 8, the microcomputer 1 enters a step 23 of FIG. 3. In the step 23, the microcomputer 1 designates the mode actuator 12, and enters a step 24. In the step 24, the microcomputer 1 judges whether or not the mode door 11 is opened more than half based on a current position a2 of the mode door 11 in the RAM. If the mode door 11 is opened more than half, the microcomputer 1 enters a step 25, where the microcomputer 1 sets a target value S2 of the mode door 11 for a full-open condition, and executes the processing of actuator driving of FIG. 4 in the step 22. If the mode door is not opened more than half, the microcomputer 1 enters a step 26, where the microcomputer 1 sets the target value S2 of the mode door 11 for a full-close condition, and executes the processing of actuator driving in the step 22. In the processing of actuator driving illustrated in FIG. 4, the microcomputer 1 reads out the current position a2 of the mode door in the step 220, and enters the step 221. In the step 221, the microcomputer 1 determines a rotational direction of the mode door 11 from the current position a2 and target value S2, and sets a direction flag to represent it. And, in the step 222, the microcomputer 1 calculates an impressed pulse number to the stepping motor 13 of the mode actuator 12 according to the calculation formula n= (current position−target value)×K, and in the step 223 rewrites the current position a2 of the mode door 11 in the RAM to the target value S2, and in the step 224 drives the stepping motor 13 of the mode actuator 12 according to the direction flag and impressed pulse number. By this, a home-position setting of the stepping motor 13 of the mode actuator 12 is finished. The mode door 11 is moved towards a full-close or full-open position and put under a condition that its movement towards one direction is checked by a stopper. Because of this, positional slippage due to causes such as vibration during an off condition of the key switch 18 can be avoided.

After the driving processing of the stepping motor 13 of the mode actuator 12, the microcomputer 1 enters a step 27 of FIG. 3. In the step 27, the microcomputer 1 designates the air-mix actuator 16, and enters a step 28. In the step 28, the microcomputer 1 judges whether or not the atmospheric temperature is above a prescribed temperature based on the atmospheric temperature from the atmospheric temperature sensor 2. In this embodiment, the prescribed temperature is 15° C. If the atmospheric temperature is above 15° C., the microcomputer 1 sets a target value S3 of the air-mix door 15 for a full-open (full-cool condition) in a step 29, and executes the processing of actuator driving of FIG. 4 in the step 22. If the atmospheric temperature is not above 15° C., the microcomputer 1 sets the target value S3 of the air-mix door 15 for a full-close (full-hot condition), and executes the processing of actuator driving of FIG. 4 in the step 22. In the processing of actuator driving as illustrated in FIG. 4, the microcomputer 1 reads out a current position a3 of the air-mix door 15 from the RAM in the step 220, and enters the step 221. In the step 221, the microcomputer 1 determines a rotational direction of the air-mix door 15 from the current position a3 and target value S3, and sets a direction flag which represents it. And, in the step 222, the microcomputer 1 calculates an impressed pulse number to the stepping motor 17 of the air-mix actuator 16 according to the calculation formula n= (current position−target value)×K, and enters the step 223. In the step 223, the microcomputer 1 rewrites the current position a3 of the air-mix door 15 in the RAM to the target value S3, and in the step 224, drives the stepping motor 17 of the air-mix actuator 16 according to the direction flag and the impressed pulse number. By this, a home-position setting of the stepping motor 17 of the air-mix actuator 16 is finished. The air-mix door 15 is moved to a full-close or full-open position and put under a condition that its movement towards one direction is checked by a stopper. Because of this, positional slippage due to causes such as vibration during an off condition of the key switch 18 can be avoided.

When the home-position setting of stepping motors 9, 13 and 17 is finished and the prescribed time of the timer circuit 19 has passed, supply of power to the air-conditioning system, including the microcomputer 1, is shut off.

When the key switch 18 is turned on, the microcomputer 1 starts a control of FIG. 5. In a step 40, the microcomputer 1 judges whether or not the current positions a1, a2 and a3 of actuators 8, 12 and 16, which are stored in the RAM, are all "0". If the backup power source of the RAM is shut off by a battery change, for example, while the key switch 18 is off, current positions a1, a2 and a3 in the RAM are initialized and all become "0". If backup of the power source is continued without being shut off, at least the current position a1 out of current positions a1, a2 and a3 in the RAM does not become "0". If the current positions a1, a2 and a3 of actuators 8, 12 and 16 are all not "0", the microcomputer 1 enters a normal air-conditioning control immediately, without performing a home-position setting each of stepping motors 9, 13 and 17 of actuators 8, 12 and 16. If the current positions a1, a2 and a3 of actuators 8, 12 and 16 are all "0", the microcomputer 1, recognizing that the current positions a1, a2 and a3 are initialized because the backup power source of the RAM was shut off while the key switch 18 was off, performs a home position setting each of the stepping motors 9, 13 and 17 of actuators 8, 12 and 16, and enters a normal air-conditioning control. In the home-position setting when the key switch 18 is turned on, the following processing is executed. First, the microcomputer 1 designates the intake actuator 8 in a step 41, sets the target value S1 of the intake door 7 for a full-close condition in a step 42, and performs a home-position setting of the stepping motor 9 of the intake actuator 8 following the processing of actuator driving of FIG. 4 in the step 22. Next, the microcomputer 1 designates the mode actuator 12 in a step 43, sets the target value S2 of the mode door 11 for a full-close condition in a step 44, and performs a home-position setting of the stepping motor 13 of the mode actuator 12 following the processing of actuator driving of FIG. 4 in the step 22. And then, the microcomputer 1 designates the air-mix actuator 16 in a step 45, sets the target value S3 of the air-mix door 15 for a full-close condition in a step 46, and performs a home-position setting of the stepping motor 17 of the air-mix actuator 16 following the processing of actuator driving of FIG. 4 in the step 22.

According to the above-mentioned embodiment, unless the backup power source of the RAM is not shut off while the key switch 18 is off, that is, normally the home-position setting of stepping motors 9, 13 and 17 is not done when the key switch 18 is turned on. Because of this, air-conditioning control rises quickly when the key switch 18 is turned on. In addition, under an off condition of the key switch 18, the intake door 7 is put under a condition to receive gravity towards the stopper on the full-close side, and the mode door 11 and air-mix door 15 are each put under a condition that it bumps against the stopper on the full-close or full-open side, therefore, positional slippage due to causes such as vibration while the key switch 18 is off can be avoided.

Figure 6:
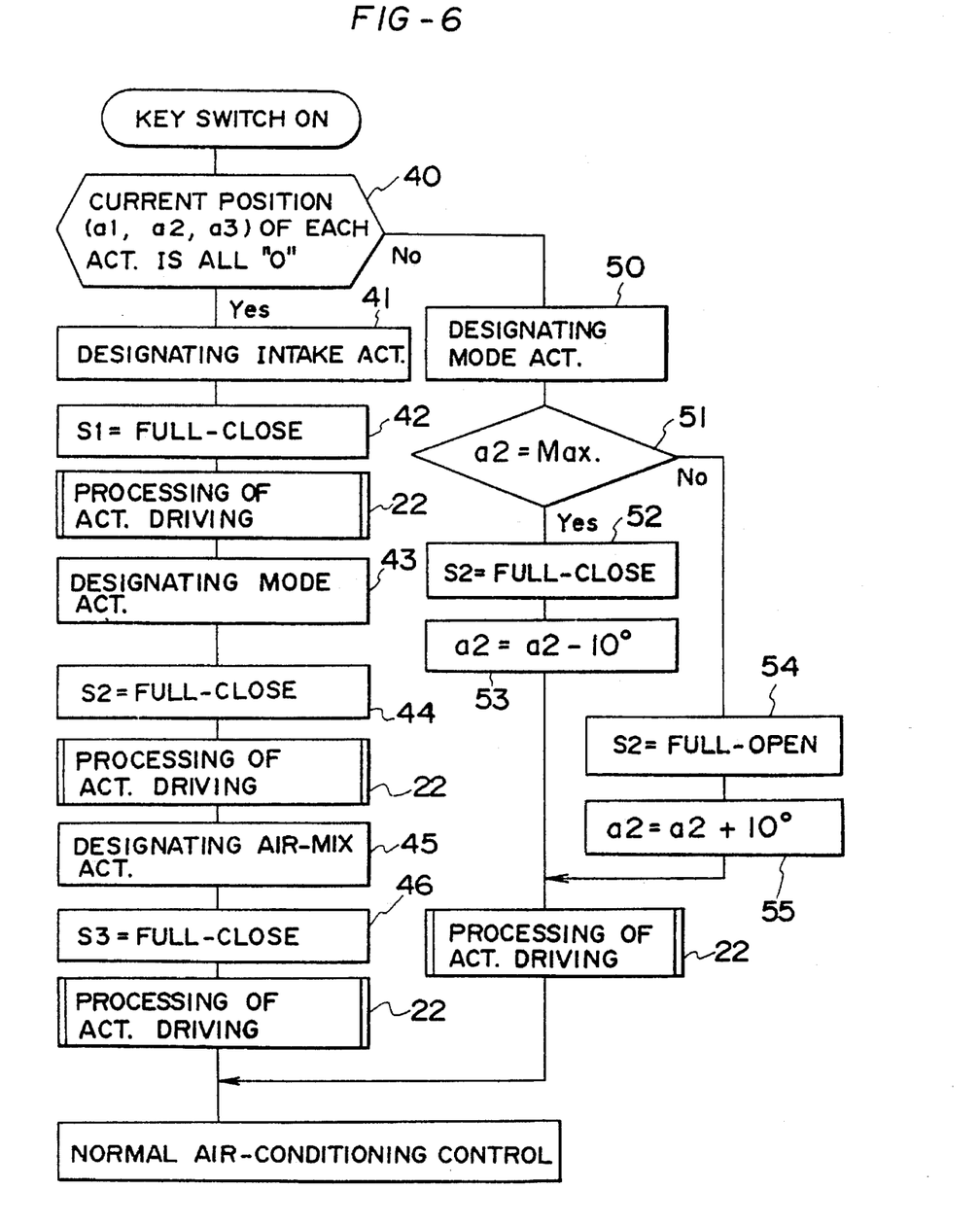
FIG. 6 is a flow diagram of the microcomputer of FIG. 2 showing a second preferred embodiment of a stepping motor control device according to the present invention and a processing when a key switch is turned on, and this is used in place of the flow diagram of FIG. 5.

FIG. 6 is a flow diagram of the microcomputer of FIG. 2 showing a second preferred embodiment. FIG. 6 shows a processing when the key switch is turned on, and this is used in place of the flow diagram of FIG. 5. In the flow diagram of FIG. 6, steps given the same marks as those of the flow diagram of FIG. 5 show the same processings.

In the processing of FIG. 6, the microcomputer 1, when current positions a1, a2 and a3 of actuators 8, 12 and 16 are all not zero, designates the mode actuator 12 in a step 50, and judges whether or not a current position a2 of the mode door 11 is a Max. (full-close condition) in a step 51. If the current position a2 of the mode door 11 is a Max., the microcomputer 1 sets a target value S2 of the mode door 11 for a full-close condition in a step 52, and after declaring a position determined by subtracting a prescribed rotational angle (10°, for example) from the current position a2 a new current position a2 in a step 53, executes the processing of actuator driving of FIG. 4 in the step 22, and enters a normal air-conditioning control. If the current position a2 of the mode door is not a Max., the microcomputer 1 sets the target value S2 of the mode door 11 for a full-open in a step 54, and after declaring a position determined by adding a prescribed rotational angle (10°, for example) to the current position a2 a new current position a2 in a step 55, executes the processing of actuator driving of FIG. 4 in the step 22, and enters a normal air-conditioning control. Other compositions and operations are as described in the first preferred embodiment. According to the second embodiment, the mode door 11 is turned towards the full-close side by the prescribed rotational angle if the mode door 11 is fully closed when the key switch is turned on, or turned towards the full-open side by the prescribed rotational angle if it is fully opened. Because of this, the mode door is pushed towards the full-close or full-open side and the aim of making the mode door 11 leakproof can be attained. Since the angle of movement is 10° or so and yet only the mode door 11 is moved, only a very short time is required compared with a conventional case in which a home-position setting of all actuators is done when a key switch is turned on.

Figure 7:
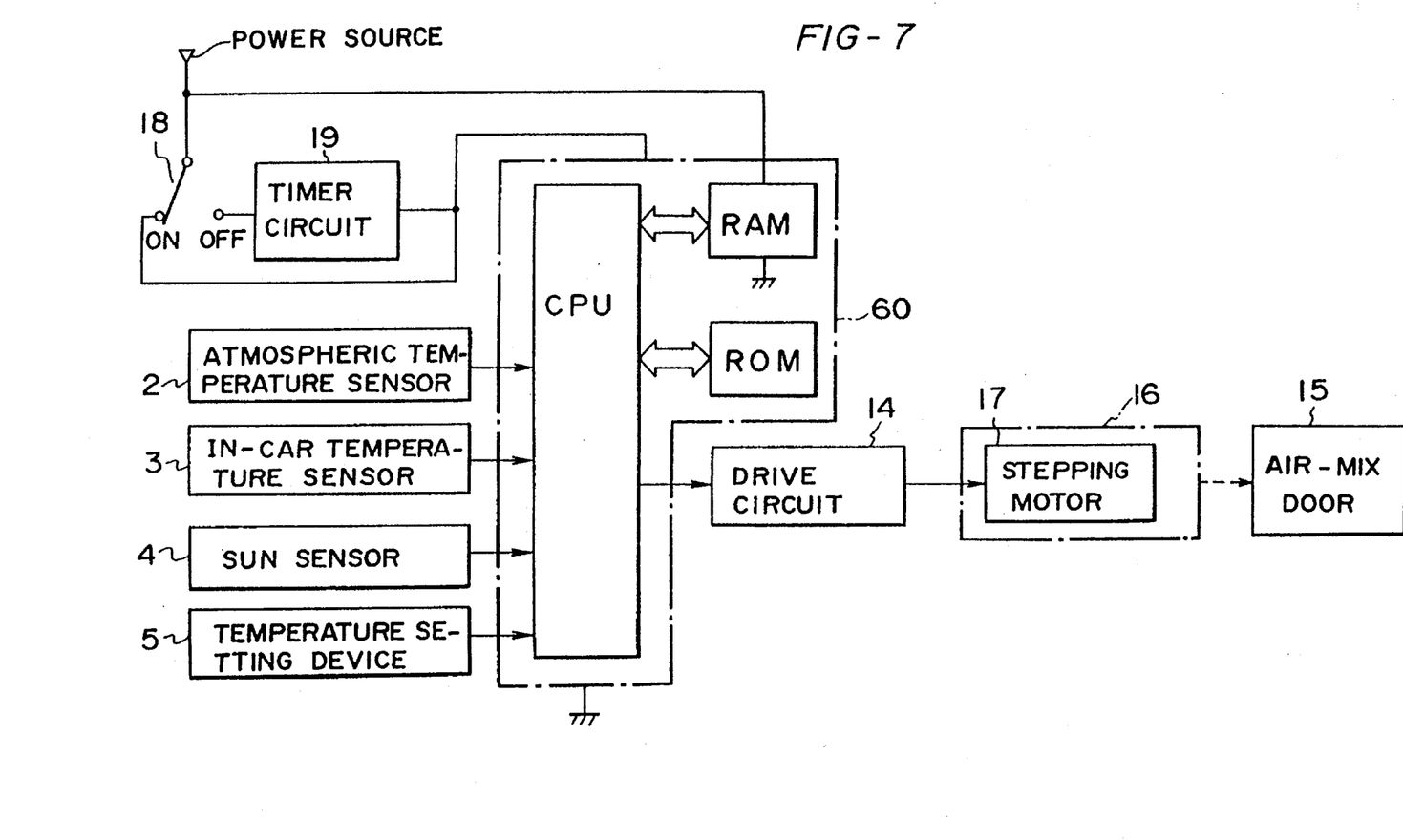
FIG. 7 is a block diagram showing a third preferred embodiment of a stepping motor control device according to the present invention.

FIG. 7 is a block diagram showing a third embodiment. In FIG. 7, a microcomputer 60 controls the stepping motor 17 of the air-mix actuator 16 which drives the air-mix door 15 via the drive circuit 14. A RAM of the microcomputer 60 is backed up by a car-mounted battery like the composition of FIG. 2. Components given the same marks as those of FIG. 2 represent the same functions.

Figure 8:
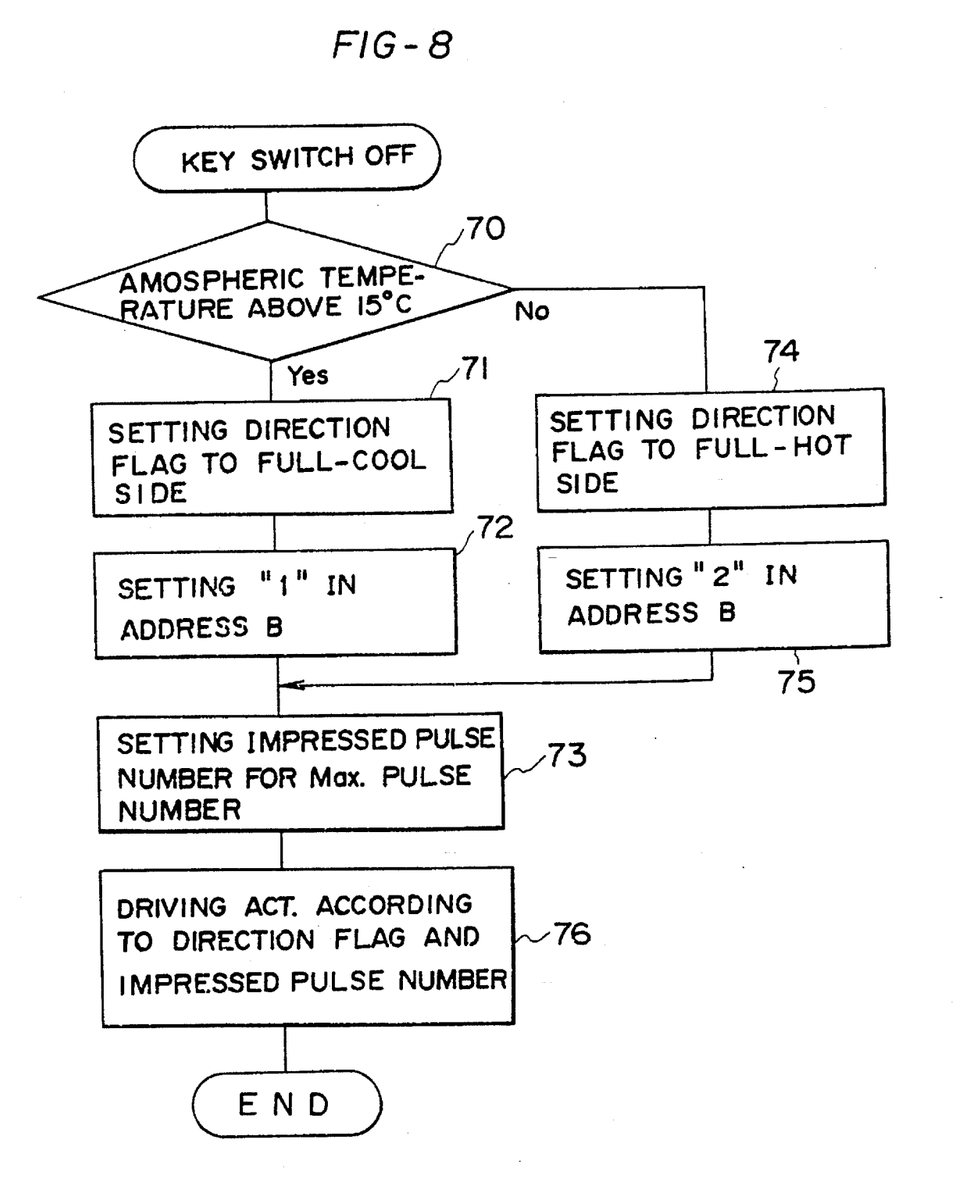
FIG. 8 is a flow diagram of the microcomputer of FIG. 7 showing a processing when a key switch is turned off.
Figure 9:
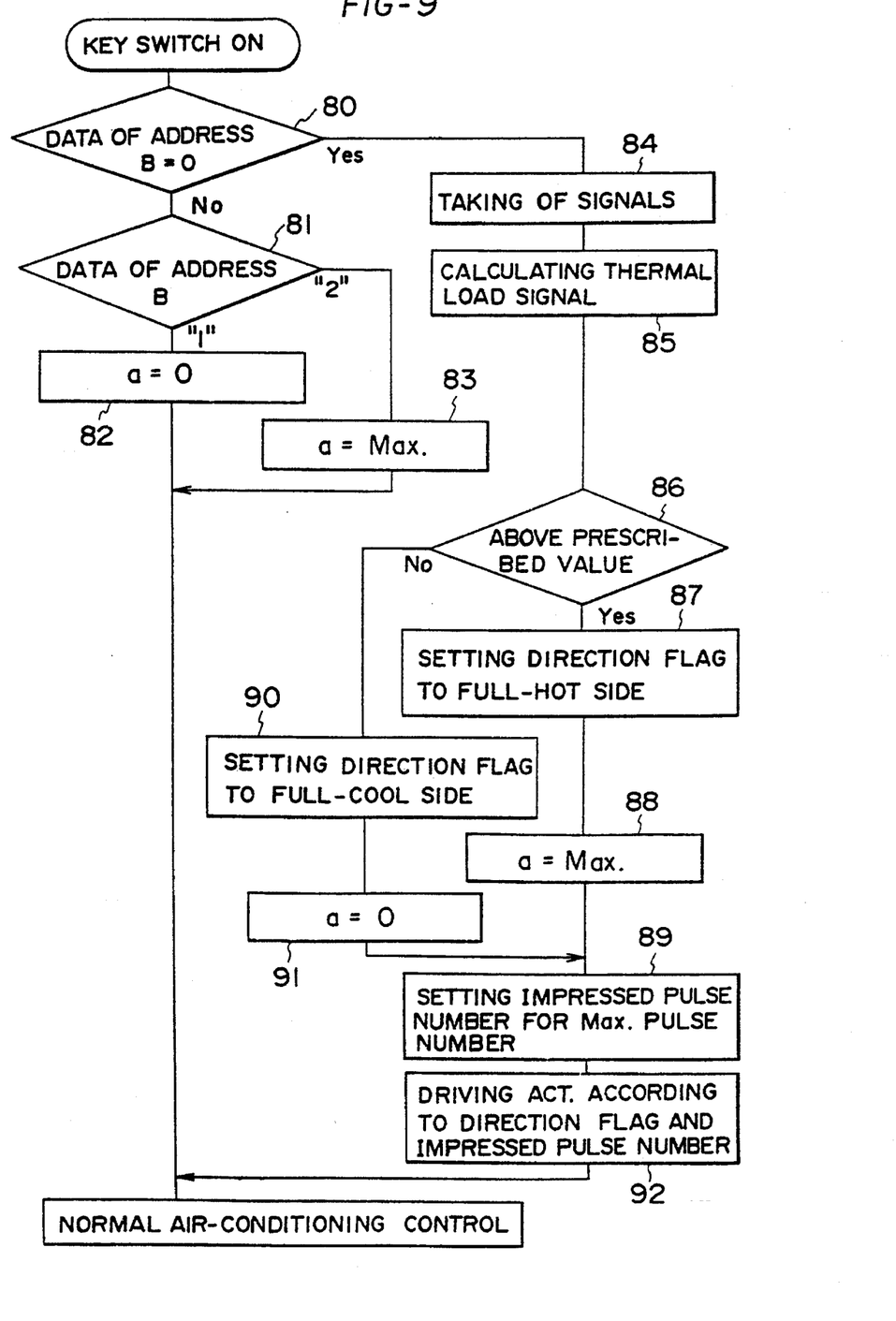

FIG. 8 and FIG. 9 are flow diagrams of the microcomputer 60 of FIG. 7. FIG. 8 shows a home-position setting when the key switch 18 is turned off, and FIG. 9 shows a processing when the key switch 18 is turned on.

When the key switch 18 is turned off, a power source is supplied to an air-conditioning system, including the microcomputer 60, for a prescribed time by the timer circuit 19. The microcomputer 60 starts a control of FIG. 8 responding to switching of the key switch 18 off, and judges whether or not the atmospheric temperature is above a prescribed temperature in a step 70. In this embodiment, the prescribed temperature is 15° C. If the atmospheric temperature is above 15° C., the microcomputer 60 sets a direction flag to a full-cool side in a step 71, sets "1" in a prescribed address B of the RAM in a following step 72, and enters a step 73. If the atmospheric temperature is not above 15° C., the microcomputer 60 sets the direction flag to a full-hot side in a step 74, sets "2" in the prescribed address B of the RAM in a following step 75, and enters the step 73. The microcomputer 60 sets an impressed pulse number for a maximum pulse number in the step 73, and drives the stepping motor 17 of the air-mix actuator 16 according to the direction flag and impressed pulse number in a following step 76. The maximum pulse number is set for a sufficient pulse number for moving the air-mix door 15 from the full-open position to the full-close position, or from the full-close position to the full-open position. When a home-position setting of the stepping motor 17 is finished, the air-mix door 15 has been moved to the full-close or full-open position and put under a condition that its movement towards one direction is checked by a stopper. Because of this, positional slippage due to causes such as vibration while the key switch 18 is off can be avoided. When the home-position setting of the stepping motor 17 is finished and the prescribed time of the timer 19 has passed, supply of power source to the air-conditioning system, including the microcomputer 60, is shut off.

When the key switch 18 is turned on, the microcomputer 60 starts a control of FIG. 9, and judges whether or not data stored in the prescribed address B of the RAM is "0" in a step 80. If the backup power source of the RAM is shut off for a battery change, for example, while the key switch 18 is off, the data of the prescribed address B is initialized and becomes "0". If the backup of power source is continued without being shut off, either "1" or "2" is stored in the prescribed address B. If the data of the prescribed address B is not "0", the microcomputer 60 judges whether the data of the prescribed address B is "1" or "2". If the data of the prescribed address B is "1", the microcomputer 60 sets a current position a of the air-mix door 15 for zero (full-cool condition) in a step 82, and enters a normal air-conditioning control. If the data of the prescribed address B is "2", the microcomputer 60 sets the current position a of the air-mix door 15 for a Max. (full-hot condition) in a step 83, and enters a normal air-conditioning control. In the meantime, if the data of the prescribed address B is "0" in the step 80, the microcomputer 60 recognizes that the data of the prescribed address B has been initialized because the backup power source of the RAM was shut off while the key switch 18 was off, and enters a step 84. The microcomputer 60 takes information from the atmospheric temperature sensor 2, in-car temperature sensor 3, sun sensor 4 and temperature setting device 5 in the step 84, calculates a thermal load signal in a step 85, and enters a step 86. The microcomputer 60 judges whether or not the thermal load signal is above a prescribed value or not in the step 86. If the thermal load signal is above the prescribed value, the microcomputer 60 sets the direction flag to the full-hot side in a step 87, sets the current position a of the air-mix door for the Max. (full-hot condition) in a following step 88, and enters a step 89. If the thermal load signal is not above the prescribed value, the microcomputer 60 sets the direction flag to the full-cool side in a step 90, sets the current position a of the air-mix door 15 for zero (full-cool condition) in a following step 91, and enters the step 89. The microcomputer 60 sets the impressed pulse number for the maximum pulse number in the step 89, drives the stepping motor 17 of the air-mix actuator 16 according to the direction flag and impressed pulse number in a following step 92, and after finishing a home-position setting of the stepping motor 17, enters a normal air-conditioning control.

According to the third preferred embodiment, unless the backup power source of the RAM is not shut off while the key switch 18 is off, that is, normally home-position setting of the stepping motors 17 is not done when the key switch 18 is turned on. Because of this, air-conditioning control rises quickly when the key switch 18 is turned on. In addition, under an off condition of the key switch 18, the air-mix door 15 is put under a condition to bump against the stopper on the full-close or full-open side, therefore, positional slippage due to causes such as vibration while the key switch 18 is off can be avoided.

As described in detail as above, according to the embodiments of the present invention, air-conditioning doors are moved towards the full-close of full-open side and home-position setting of stepping motors is done when the key switch is turned off, and immediately a normal air-conditioning control is started when the key switch is turned on, without performing home-position setting. Because of this, the rise time of air-conditioning control when the key switch is turned on can be reduced. In addition, under an off condition of the key switch, air-conditioning doors are each moved to the full-close or full-open position and put under a condition that its movement towards one direction is checked by the stopper, therefore, positional slippage due to causes such as vibration while the key switch is off can be avoided.

From the foregoing it will now be apparent that a new and improved stepping motor control device for an automobile air-conditioning system has been found. It should be understood of course that the embodiments disclosed are merely illustrative and are not intended to limit the scope of the invention. Reference should be made to the appended claims, rather than the specification as indicating the scope of the invention.

What is claimed is:

1. A stepping motor control device for an automobile air-conditioning system comprising:

at least one stepping motor for driving an air-conditioning door of said automobile air-conditioning system;

memory means for storing a current position of said air-conditioning door, said memory means being supplied with power from a car-mounted battery irrespective of an on/off condition of a key switch of the automobile;

key-off home-position setting means, responsive to an off condition of said key switch of the automobile, for performing a home-position setting of said stepping motor, said key-off home-position setting means driving said stepping motor so that said air-conditioning door is driven to a full-close or full-open position and storing information indicative of the full-close or full-open position in said memory means as a current position of said air-conditioning door;

timer means, responsive to the off condition of said key switch of the automobile, for supplying power to said key-off home-position setting means for a prescribed time within which said key-off home-position setting means can finish the home-position setting; and key-on control means, responsive to an on condition of said key switch of the automobile, for determining whether the information indicative of the current position of said air-conditioning door is stored in said memory means, for starting a normal air-conditioning control without performing the home-position setting of said stepping motor when the information indicative of the current position is stored in said memory means, and for starting the normal air-conditioning control after performing the home-position setting of said stepping motor when the information indicative of the current position is not stored in said memory means.

2. The stepping motor control device of claim 1, wherein said air-conditioning door is an intake door, and said key-off home-position setting means comprises:

target value setting means for setting an intake door target value to the full-close position;

determination means for determining a rotational direction of said stepping motor from said intake door target value and the information indicative of the current position stored as an intake door current position in said memory means;

calculation means for determining an impressed pulse number for said stepping motor based on said intake door target value and said intake door current position;

driving means for driving said stepping motor according to the determined rotational direction and the impressed pulse number; and writing means for writing said intake door target value, as said intake door current position, in said memory means.

3. The stepping motor control device of claim 2, wherein said intake door is held against a stopper in the full-close position by gravity.

4. The stepping motor control device of claim 2, wherein the impressed pulse number for said stepping motor is determined as $$n = (a1 - S1) \times K$$

where n is the impressed pulse number, a1 is said intake door current position, S1 is said intake door target value, and K is a step angle coefficient indicative of a rotational angle said stepping motor is driven per pulse.

5. The stepping motor control device of claim 1, wherein said air-conditioning door is a mode door, and said key-off home-position setting means comprises:

judging means for determining if said mode door is more than half open;

target value setting means for setting a mode door target value to the full-open position if said mode door is more than half open and for setting said mode door target value to the full-close position if said mode door is not more than half open;

determination means for determining a rotational direction of said stepping motor from said mode door target value and the information indicative of the current position stored as a mode door current position in said memory means;

calculation means for determining an impressed pulse number for said stepping motor based on said mode door target value and said mode door current position;

driving means for driving said stepping motor according to the determined rotational direction and the impressed pulse number; and writing means for writing said mode door target value, as said mode door current position, in said memory means.

6. The stepping motor control device of claim 5, wherein the impressed pulse number for said stepping motor is determined as $$n=(a2-A2)\times K$$

where n is the impressed pulse number, a2 is said mode door current position, S2 is said mode door target value, and K is a step angle coefficient indicative of a rotational angle said stepping motor is driven per pulse.

7. The stepping motor control device of claim 1, wherein said air-conditioning door is an air-mix door, and said key-off home-position setting means comprises:

judging means for determining if an atmospheric temperature is above a prescribed temperature;

target value setting means for setting an air-mix door target value to the full-open position to be in a full-cool condition if the atmospheric temperature is above the prescribed temperature and for setting said air-mix door target value to the full-close position to be in a if the atmospheric temperature is below the prescribed value;

determination means for determining a rotational direction of said stepping motor from said air-mix door target value and the information indicative of the current position stored as an air-mix door current position in said memory means;

calculation means for determining an impressed pulse number for said stepping motor based on said air-mix door target value and said air-mix door current position;

driving means for driving said stepping motor according to the determined rotational direction and the impressed pulse number; and writing means for writing said air-mix door target value, as said air-mix door current position, in said memory means.

8. The stepping motor control device of claim 7, wherein the impressed pulse number for said stepping motor is determined as $$n=(a3-S3)\times K$$

where n is the impressed pulse number, a3 is said air-mix door current position, S3 is said air-mix door target value, and K is a step angle coefficient indicative of a rotational angle said Stepping motor is driven per pulse.

9. The stepping motor control device of claim 1, wherein said key-on control means determines whether the information indicative of the current position of said air-conditioning door is stored in said memory means based on whether said memory means is initialized.

10. The stepping motor control device of claim 9, wherein said key-on control means includes home-position setting means which is driven when the information indicative of the current position of said air-conditioning door is not stored in said memory means, said home-position setting means comprising:

target value setting means for setting an air-conditioning door target value for the full-close position;

determination means for determining a rotational direction of said stepping motor from said air-conditioning door target value and the information indicative of the current position stored as an air-conditioning door current position in said memory means;

calculation means for determining an impressed pulse number for said stepping motor based on said air-conditioning door target value and said air-conditioning door current position;

driving means for driving said stepping motor according to the determined rotational direction and the impressed pulse number; and writing means for writing said air-conditioning door target value, as said air-conditioning door current position, in said memory means.

11. The stepping motor control device of claim 10, wherein the impressed pulse number for said stepping motor is determined as $$n=(a-S)\times K$$

where n is the impressed pulse number, a is said air-conditioning door current position, S is the air-conditioning door target value, and K is a step angle coefficient indicative of a rotational angle said stepping motor is driven per pulse.

12. The stepping motor control device of claim 1, having a first stepping motor for driving an intake door, a second stepping motor for driving a mode door, and a third stepping motor for driving an air-mix door, wherein said key-off home-position setting means comprises:

first target value setting means for setting an intake door target value to the full-close position;

first determination means for determining a first rotational direction of said first stepping motor from said intake door target value and the information indicative of the current position stored as an intake door current position in said memory means;

first calculation means for determining a first impressed pulse number of said first stepping motor based on said intake door target value and said intake door current position;

first driving means for driving said first stepping motor according to the determined first rotational direction and the first impressed pulse number;

first writing means for writing said intake door target value, as said intake door current position, in said memory means;

mode door judging means for determining if said mode door is more than half open;

second target value setting means for setting a mode door target value to the full-open position if said mode door is more than half open and for setting said mode door target value to the full-close position if said mode door is not more than half open;

second determination means for determining a second rotational direction of said second stepping motor from said mode door target value and the information indicative of the current position Stored as a mode door current position in said memory means;

second calculation means for determining a second impressed pulse number of said second stepping motor based on said mode door target value and said mode door current position;

second driving means for driving said second stepping motor according to the determined second rotational direction and the second impressed pulse number;

second writing means for writing said mode door target value, as said mode door current position, in said memory means;

atmospheric temperature judging means for determining if an atmospheric temperature is above a prescribed temperature;

third target value setting means for setting an air-mix door target value to the full-open position to be in a if the atmospheric temperature is above the prescribed temperature and for setting said air-mix door target value to the full-close position to be in a if the atmospheric temperature is below the prescribed temperature;

third determination means for determining a third rotational direction of said third stepping motor from said air-mix door target value and the information indicative of the current position stored as an air-mix door current position in said memory means;

third calculation means for determining a third impressed pulse number of said third stepping motor based on said air-mix door target value and said air-mix door current position;

third driving means for driving said third stepping motor according to the determined third rotational direction and the third impressed pulse number; and third writing means for writing said air-mix door target value, as said air-mix door current position, in said memory means.

13. The stepping motor control device of claim 12, wherein the first, second add third impressed pulse numbers are each determined as $$n=(a-S) \times K$$

where n is the first, Second and third impressed pulse numbers, respectively; a is said intake door, mode door and air-mix door current positions, respectively: S is said intake door, mode door and air-mix door target values, respectively and K is a step angle coefficient indicative of rotational angles said first, second and third stepping motors are respectively driven per pulse.

14. The stepping motor control device of claim 12, wherein said key-on control means includes mode door driving means which is driven when said intake door, mode door and air-mix door current positions are stored in said memory means, said mode door driving means comprising:

judging means for determining if said mode door is fully opened or fully closed; and fourth driving means for driving said second stepping motor to turn said mode door towards the full-close position by a prescribed rotational angle if said mode door is fully closed and for driving said second stepping motor to turn said mode door towards the full-open position by the prescribed rotational angle if said mode door is fully opened.

15. A stepping motor control device for an automobile air-conditioning system comprising:

a stepping motor for driving an air-mix door of said automobile air-conditioning system;

memory means, which is supplied with power from a car mounted battery irrespective of an on/off condition of a key switch of the automobile, for storing data;

key-off home-position setting means, responsive to an off condition of said key switch of the automobile, for performing a home-position setting of said stepping motor, said key-off home-position setting means driving said stepping motor so that said air-mix door is driven to a full-close position to be in a or a full-open position to be in a and storing data indicative of the full-close or full-open position in said memory means;

timer means, responsive to the off condition of said key switch of the automobile, for supplying power to said key-off home-position setting means for a prescribed time within which said key-off home-position setting means can finish the home-position setting; and key-on control means, responsive to an on Condition of said key switch of the automobile, for determining whether the data representing the full-close position and full-open position is stored in said memory means, for starting a normal air-conditioning control without performing the home-position setting of said stepping motor when the data is stored in said memory means, and for starting the normal air-conditioning control after performing the home-position setting of said stepping motor when the data is not stored in said memory means.

16. The stepping motor control device of claim 15, wherein said key-off home-position setting means comprises:

means for determining if an atmospheric temperature is above a prescribed temperature;

means for determining a driving direction of said air-mix door as toward the full-open position and for writing the data representing the full-open position in said memory means if the atmospheric temperature is above the prescribed temperature and for determining the driving direction of said air-mix door as toward the full-close position and for writing the data representing the full-close position in said memory means if the atmospheric temperature is below the prescribed temperature;

means for determining an impressed pulse number for said stepping motor as a maximum pulse number; and means for driving said stepping motor according to the determined driving direction and the impressed pulse number.

17. The stepping motor control device of claim 15, wherein said key-on control means recognizes a current position of said air-mix door from the data and starts the normal air-conditioning control when the data is stored in said memory means.

18. The stepping motor control device of claim 15, wherein said key-on control means includes home-position setting means which is driven when the data is not stored in said memory means, said home-position setting means comprising:

means for determining a thermal load signal representing a quantity of thermal load to control a passenger compartment of the automobile to a set temperature and for determining if the thermal load signal is above a prescribed value;

means for determining that a driving direction of said air-mix door is toward the full-close position and that a current position of said air-mix door is the full-close position if the thermal load signal is above the prescribed value and for determining that the driving direction of said air-mix door is toward the full-open position and that the current position of said air-mix door is the full-open position if the thermal load signal is below the prescribed value;

means for setting an impressed pulse number for said stepping motor for a maximum pulse number; and means for driving said stepping motor according to the determined driving direction and the impressed pulse number.

19. An air-conditioning system for an automobile comprising:

an actuator for opening and closing an air-conditioning door of the air-conditioning system;

a switch for turning the automobile on and off;

a memory for storing data; and control means, coupled to said switch and said memory, for (a) instructing said actuator to drive said air-conditioning door to a full-close position or a full-open position and storing position data indicative of a current position of said air-conditioning door in said memory, in response to manipulation of said switch to an off position and (b) instructing said actuator to drive said air-conditioning door to a full-close position and thereafter entering a normal air-conditioning control mode upon determination that the position data is not stored in said memory and directly entering the normal air-conditioning control mode upon determination that the position data is stored in said memory, in response to manipulation of said switch to an on position.

20. The air-conditioning system of claim 19, further comprising:

a power source for supplying power to the air-conditioning system; and a timer, coupled to said switch and said power source, for supplying the power to said control means for a predetermined time after manipulation of said switch to the off position to enable said control means to complete processing, the power being supplied to said memory regardless of whether said switch is in the on position or the off position.

21. The air-conditioning system of claim 20, wherein upon failure of said power source, said control means initializes said position data, after said power source is restored, to be indicative of power source failure and loss of said position data.

22. The air-conditioning system of claim 19, wherein said air-conditioning door is in an air-intake door and said control means instructs said actuator to drive said air-intake door to the full-close position in response to manipulation of said switch to the off position.

23. The air-conditioning system of claim 19, wherein said air-conditioning door is a mode door, said control means determining whether said mode door is more than half open and instructing said actuator to drive said mode door to the full-open position if said mode door is more than half open and to the full-close position if said mode door is not more than half open.

24. The air-conditioning system of claim 19, wherein said air-conditioning door is an air-mix door, said control means determining, in response to manipulation of said switch to the off position, whether an atmospheric temperature exceeds a predetermined temperature and instructing said actuator to drive said air-mix door to the full-open position to be in a full-cool condition if the atmospheric temperature exceeds the predetermined temperature and to the full-close position to be in a full-hot condition if the atmospheric temperature does not exceed the predetermined temperature.

25. The air-conditioning system of claim 19, wherein said air-conditioning door is a mode door, said control means, upon determination that the position data is stored in said memory in response to manipulation of said switch to the on position, instructs said actuator to drive said mode door a further predetermined amount toward the full-open position if the position data is indicative that said mode door is in the full-open position and the further predetermined amount toward the full-close position if the position data is indicative that said mode door is in the full-close position, prior to entering the normal air-conditioning control mode.

26. The air-conditioning system of claim 19, wherein said actuator is a stepping motor.

* * * * *